United States Patent [19]

Leland et al.

[11] 4,264,868
[45] Apr. 28, 1981

[54] HIGH POWER GAS LASER AMPLIFIER

[75] Inventors: Wallace T. Leland; Thomas F. Stratton, both of Los Alamos, N. Mex.

[73] Assignee: The United States of America as represented by the United States Department of Energy, Washington, D.C.

[21] Appl. No.: 951,543

[22] Filed: Oct. 13, 1978

[51] Int. Cl.³ .......................... H01S 3/03; H01S 3/01
[52] U.S. Cl. .............................. 330/4.3; 331/94.5 G; 331/94.5 PE
[58] Field of Search ................. 330/4.3; 331/94.5 PE, 331/94.5 G

[56] References Cited

U.S. PATENT DOCUMENTS 3,818,375  6/1974  Stapleton et al. ............ 331/94.5 PE
3,973,213  8/1976  Rockwood et al. ................... 330/4.3

OTHER PUBLICATIONS

Leland, et al., "Large-Apertured . . . CO₂ Amplifiers", 10/77, pp. 506-508, 7th Symp. on Engin. Prof. of Fusion Research, Part 1.
Lada, "Electron Beams for Pulsed Lasers", 8/15/1978, pp. 69-74, SPIE, vol. 138, Advances in Laser Technology.
Bayless, "Plasma-Cathode Electron Gun", pp. 1158-1160, Rev. Sci. Instrum., vol. 46, #9.
Lamberton, "CO₂ Long Pulse Electron Beam Lasers", p. 328, Inst. Phys. Conf., Ser. No. 29, 1976, Capri, Italy.
Bradley, "Electron Beam Pumping of Visible and Ultraviolet Gas Lasers", 10/75, pp. 58-108, Inst. Phys. Conf., Ser. No. 29.
Stratton, "CO₂ Short Pulse Laser Technology", 10/75, Inst. Phys. Conf., Ser. No. 29.
Stapleton et al., "Electron Beam Controlled Lasers . . . ", 11/9/73, pp. 619-625, Fifth Symposium on Engineering Problems of Fusion Research, Princeton University.

Primary Examiner—Nelson Moskowitz
Attorney, Agent, or Firm—Jerome B. Rockwood; Paul D. Gaetjens; James E. Denny

[57] ABSTRACT

A high power output $CO_2$ gas laser amplifier having a number of sections, each comprising a plurality of annular pumping chambers spaced around the circumference of a vacuum chamber containing a cold cathode, gridded electron gun. The electron beam from the electron gun ionizes the gas lasing medium in the sections. An input laser beam is split into a plurality of annular beams, each passing through the sections comprising one pumping chamber.

17 Claims, 5 Drawing Figures

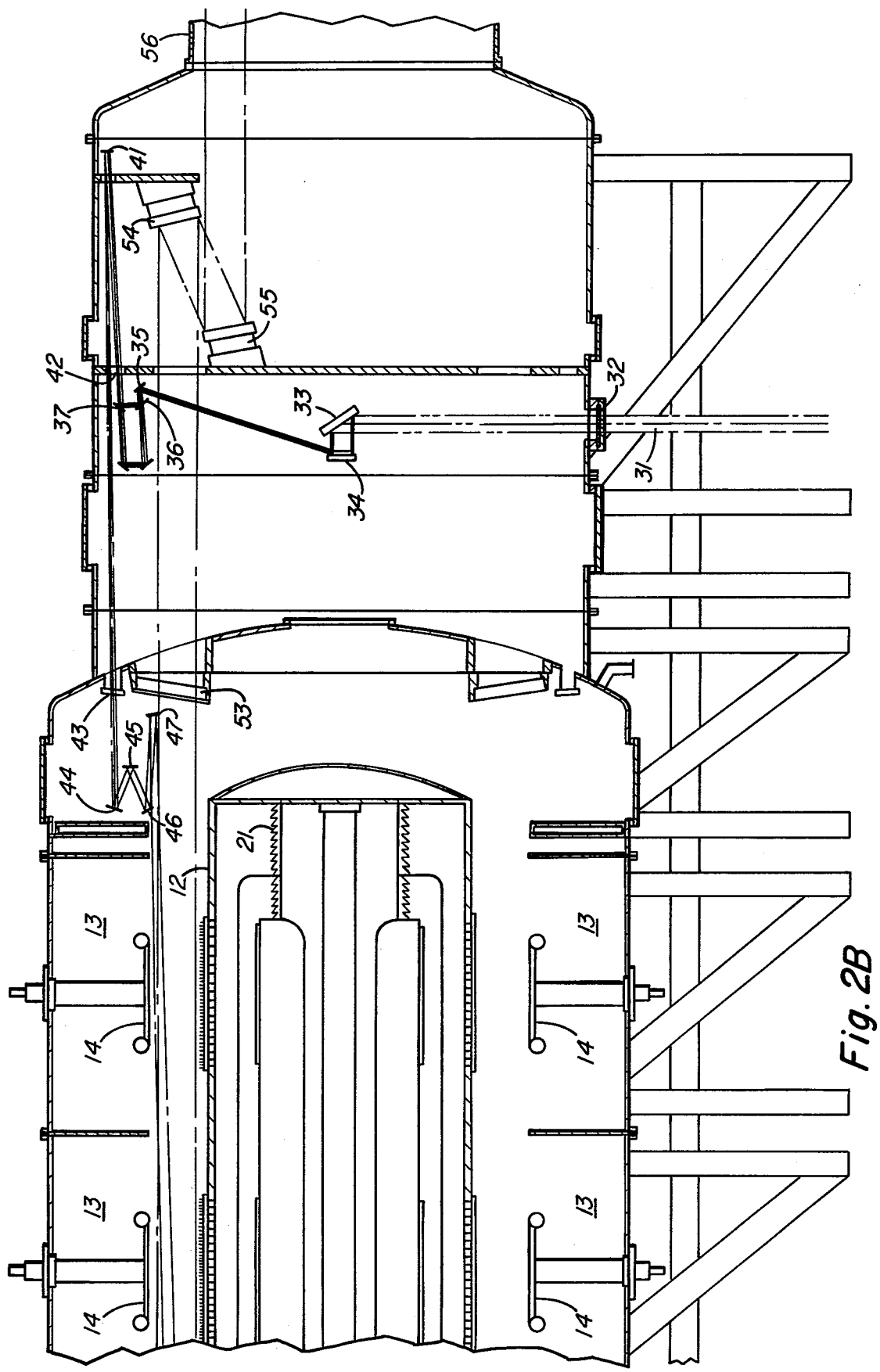

HIGH POWER GAS LASER AMPLIFIER

BACKGROUND OF THE INVENTION

The present invention relates to high energy gas lasers, and more particularly, to a large, high pressure, gas laser power amplifier.

The requirements of large energies on the order of tens of kilojoules, and short pulse durations of a nanosecond or less create unique design problems in high power laser amplifiers. With the large energies, it is desirable to use high flux densities to minimize size and cost. At present, two kinds of lasers are widely used where extremely high output energies are required: solid neodymium glass lasers with a 1.06 $\mu$m wavelength and carbon dioxide lasers with a 10.6 $\mu$m wavelength. The neodymiun glass lasers have been popular because of a well established, fifteen-year-old technology. However, solid state lasers such as neodymium glass, are limited in capability because of their low efficiency of approximately 0.17%, and a low pulse repetition rate capability of approximately 6 times per hour. The more recently developed high pressure electron beam controlled $CO_2$ laser, is unique in being relatively efficient, on the order of 3% to 5%, together with providing a short pulse of 0.5 to 1 ns duration, a high repetition rate, and high power output. It also has the valuable features of rapid waste heat removal and employment of an easily replaced, damage free gain medium.

The efficient creation of a population inversion in $CO_2$-nitrogen gas mixtures which lead to the 10 $\mu$m radiation depends on two circumstances. First, the vibrational level of nitrogen is readily pumped by inelastic electron molecule collisions. Second, this vibrational level is nearly coincident with the 001 level of $CO_2$ and the excitation of the $N_2$ is shared quickly with the $CO_2$. The electrical excitation efficiency for the 001 level depends upon the specific gas mixture employed, but under optimum conditions is approximately 50% for short pulse operation. The transitions of interest are the 9 and 10 $\mu$m transitions to the 020 and 100 levels. Up to 50% of the inversion is theoretically available from the excitation. However, the rate at which the energy can be extracted is limited by the rate of gas kinetic collisions between the rotational sublevels of the upper and lower vibrational levels which are the total level populations. An overall efficiency of 30% had been demonstrated for continuous operation of $CO_2$ lasers. However, for sub-nanosecond pulse extraction an overall efficiency of 2% is more typical.

It has been known that very short pulse amplification in $CO_2$, along with compact power amplifiers, could be achieved by operation at or above atmospheric pressure, but there remains a problem of discharge stability at these higher pressures. This problem was solved by the TEA, that is, transversely electrically excited, atmospheric pressure $CO_2$ lasers, utilizing electrode discharges. However, the electric field to pressure ratio required to maintain the ionization in the discharge was far too large for most efficient vibrational excitation of nitrogen. Electron beam control provided the solution to this problem, making the $CO_2$ laser an efficient short pulse amplifier. An externally generated electron beam enters the amplifier medium and provides the required ionization independently of the discharge voltage. The applied voltage, therefore, can be chosen to effect the most efficient discharge pumping for the gas mixture and total gas pressure applied. The discharge thus formed has the additional advantage of being stable against arcing.

It is apparent, therefore, that the $CO_2$ gas laser offers many advantages for the production of high energy pulses. Electrical efficiency is high. Short pulse extraction efficiencies of greater than 10% are possible by the use of multiple pulse energy extraction. The gas medium of the $CO_2$ laser essentially eliminates concerns of damage to the medium that can arise in solid state lasers such as neodymium glass, and the gas is easily exchanged by flow to provide cooling. Thus the laser medium is not the controlling element for high repetition rates. Long pulse $CO_2$ lasers have been operated at repetition rates of 750 Hz. Short pulse $CO_2$ lasers can be operated at repetition rates ranging from a few Hz up to 50 Hz.

$CO_2$ laser systems of a given power output are more compact than those of neodymium glass. In high output $CO_2$ lasers it is desirable to use high flux densities to minimize size and cost. The population inversion in $CO_2$ lasers occurs between vibrational levels in the electronic ground state. Superimposed on the vibrational levels are the rotational levels and, on a nanosecond time scale, the energy exchange rate between rotational levels can substantially affect the amount of energy that can be extracted, as well as the temporal shape of the amplified pulse. In addition to gain saturation effects, energy extraction and pulse shape in the nonosecond regime also required due consideration of bandwidth and coherent phenomena. For efficient performance, high gas pressure is employed, since the rotational energy transfer time varies inversely with pressure, and line broadening is directly proportional to pressure. Simultaneous extraction of energy on several lines is also very desirable, but must be weighed against the increased cost complexities it entails.

High gas pressure is also desirable in order to obtain a high density of energy storage in relatively small size amplifiers. Energy storage density for a given gas mixture and temperature is proportional to the product of pressure and small signal gain. Since pumping efficiency and parasitic oscillation place limits on small signal gain, high energy storage density generally requires high pressure operation. However, the pressure is limited by the necessity of higher discharge voltages and gas optical breakdown, the breakdown threshold varying inversely with pressure.

As noted above, two types of high pressure $CO_2$ amplifiers are currently in general use: those employing self-sustained electrical discharges, and those which use an external source of high energy electrons to provide the gas ionization for maintaining the electrical discharge. At their present state of development, each type has special virtues and limitations. Self-sustained discharge amplifiers are limited in size to a gap width times pressure product of about 20 cm atmospheres, must operate at a higher than desirable electric-field-to-number-density ratio, and utilize gas mixtures not optimal for nanosecond pulse amplifiers. They can, however, produce a uniform amplifier medium and are generally simpler than E-beam sustained amplifiers, which require the addition of a high voltage electron gun. E-beam sustained amplifiers can be made to operate with much larger PD values. They can be operated with both optimal gas mixtures and optimal E/N values.

Uniformity in the amplifier medium is difficult to achieve in very large amplifiers. Any nonuniformity in spatial distribution of ionization from the external electron beam results in nonuniformities of the discharge. Magnetic fields from the discharge current can severely affect the trajectories of the electrons from the external gun and thus cause nonuniform ionization. Because of the size limitations on self-sustained types, the present invention employs an electron beam.

Gas mixtures chosen for nanosecond pulse amplifiers differ from those used in most applications. Nitrogen is used in laser gas mixtures because it readily exchanges its vibrational energy with the upper laser level in $CO_2$ molecules and in effect, provides a very selective channel for funneling energy from the electric discharge into the desired state of the $CO_2$ molecule. The $CO_2$ upper state level population essentially comes into equilibrium with the nitrogen levels during the pumping time of a few microseconds. During the nanosecond energy extraction time, however, no significant energy transfer from the nitrogen occurs, and the energy stored in the nitrogen molecules is wasted. For this reason, the optimal mixtures for nanosecond pulse amplifiers use less nitrogen.

SUMMARY OF THE INVENTION

The most desirable gas mixtures balance the benefits from selective nitrogen excitation with losses due to energy left in the nitrogen. Helium is used in most gas mixtures because of its beneficial action in relaxing the lower state population density. Because it has no low lying states, helium also permits the desired average electron energy to be attained from a lower E/N ratio in the discharge. Because the relaxation process is inconsequential during periods as short as a nanosecond, helium is not beneficial in short pulse amplifiers except where operation at lower E/N ratios is required. In very large volume amplifiers, the use of helium requires, for economic reasons, a helium recovery system. The gas mixture employed in the present invention, therefore, uses a 1:4 mixture of $N_2$ and $CO_2$. While the lack of helium in the mixture requires higher voltages, a higher impedance is presented to the discharge. Further, the helium-free mixture is more efficient for nanosecond pulses, and is a superior in terms of the desired values of rotational relaxation time and linewidth.

The present invention provides 100 kJ of focusable optical energy to be delivered to the target on a 1 ns pulse. The peak power of 100 terawatts may be increased for shorter pulses, that is to 200 terawatts for ¼ ns pulses, without damage to optical components. The laser operates on several rotational lines simultaneously in order to extract energy from the entire rotational manifold during the 1 ns or shorter pulse.

The $CO_2$ laser system of the present invention consists of an oscillator-preamplifier subsystem feeding six separate power amplifiers. The oscillator-preamplifier incorporates a high-contrast-ratio electro-optic switch-out and saturable absorbers between preamplifiers. In the power amplifiers, a two pass layout requires 36 J input to extract 80% of the stored energy in one ns. The power amplifiers are electron beam controlled. Twelve pumping chambers surround a central electron beam gun in an annular configuration. The discharge regions have a trapezoidal cross-section of 30.5 cm by 35.6 cm and a total active length of 300 cm. The high pressure 1800 torr laser gas mix of 4 parts $CO_2$ to 1 part $N_2$ is ionized by radial electron beams which are generated by a central electron beam gun. The annular arrangement has the advantage in that it utilizes one common gun for 12 chambers and improves the gain uniformity as a result of the radial geometry. However, the azimuthal magnetic field associated with the axially returning gas current deflects the electron beam trajectories, giving rise to a gas pinch. To avoid this, each pumping chamber is subdivided into four anode sections with symmetrical radial current returns between sections. The laser is pumped with an electric field of 18 kV/cm, and a current density of 6 $A/cm^2$, to a gain length of 6.9. The absorbing cold gas between anodes and in the optical sections reduces this to a net gain length of 6. At present, this is an upper limit to prevent parasitic oscillations within the amplifiers. The pumping time is kept to less than 1.5 $\mu s$ to minimize parasitics and target pre-pulse.

The central electron beam gun generates 12 large area electron beams with an energy of 500 keV. A cold cathode is employed in the gun because of its simplicity compared to a hot cathode. Because a space-charged-limited diode cannot produce as low a current density as the required 50 $mA/cm^2$ in the available gun space, a triode design is employed. A coaxial resistively biased grid with a transparency to electrons of 80% provides current limitation and more current stability during the pulse than a typical diode type electron gun. To reduce the magnetic field by a factor of 2, the gun is fed from both ends. However, access to the gun exists only from one end because of the optical input and output system. Therefore, a triaxial feed is employed which combines a one sided access with two sided feed. This also permits gun removal to one side without electrical connection problems at the far end.

BRIEF DESCRIPTION OF THE DRAWINGS

FIGS. 2A and 2B present a perspective partially cut-away.

DESCRIPTION OF THE PREFERRED EMBODIMENT

Figure 1:
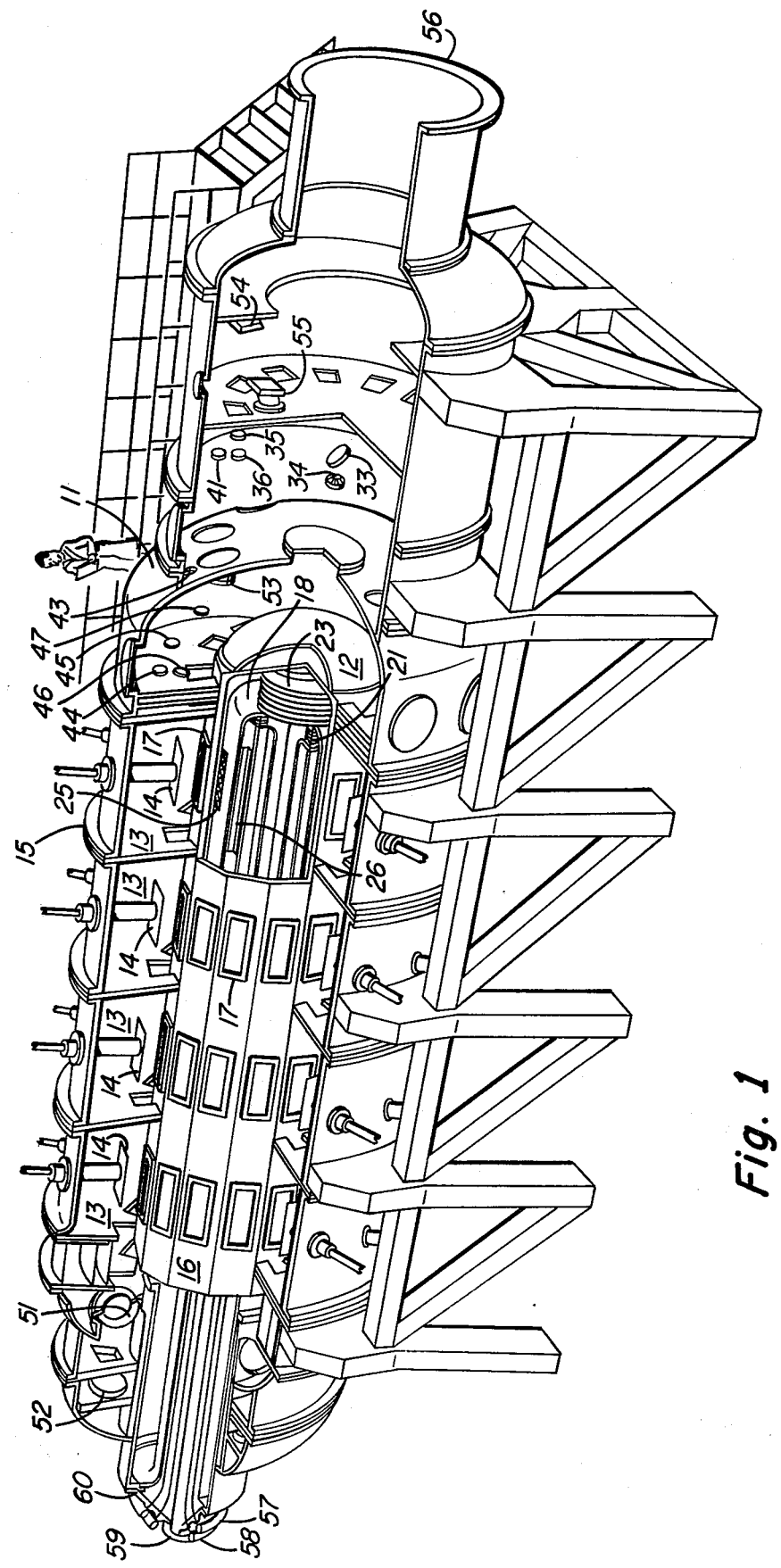
FIG. 1 is a longitudinal cross-section of the high energy laser amplifier of the present invention.
Figure 2A:
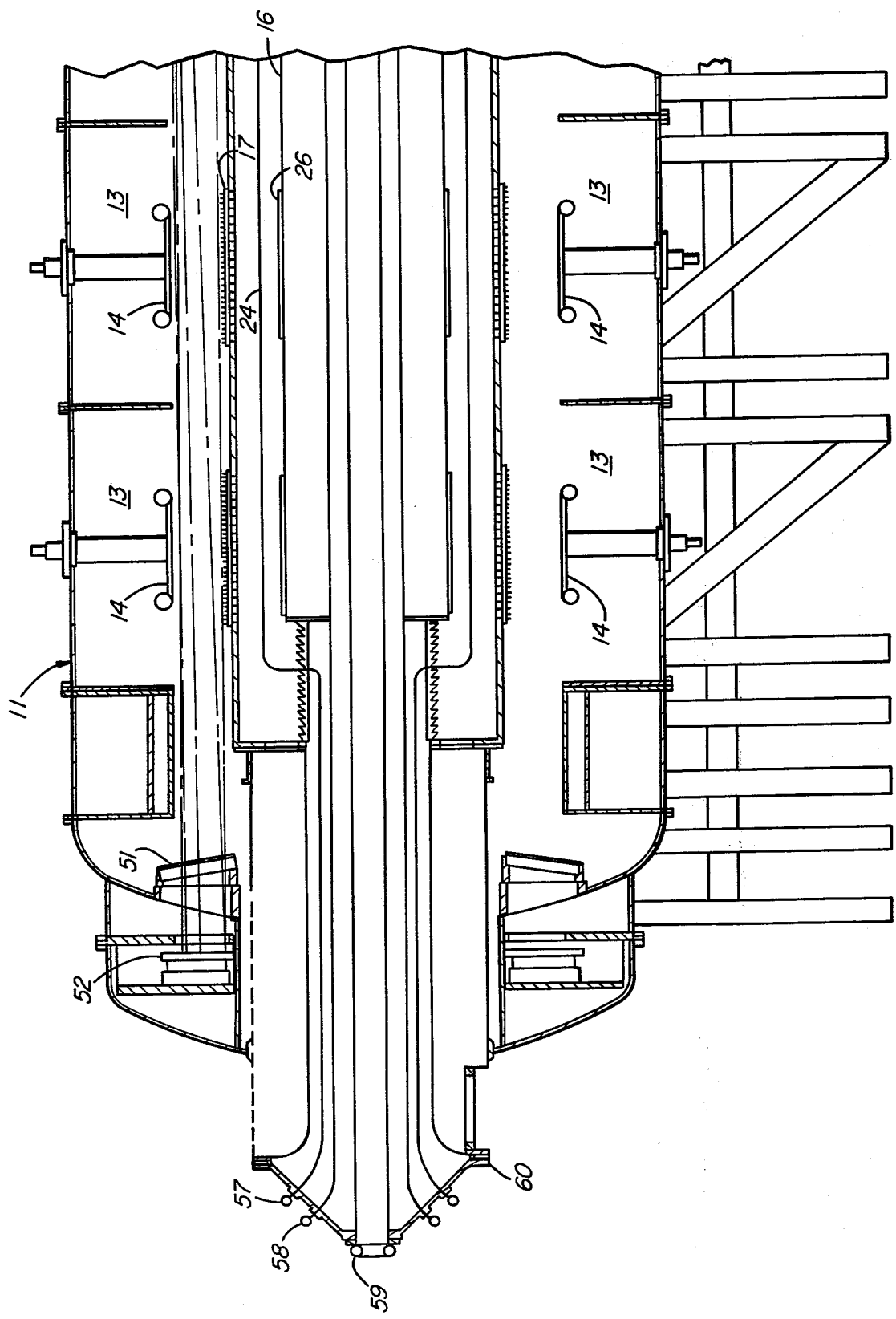
Figure 3:
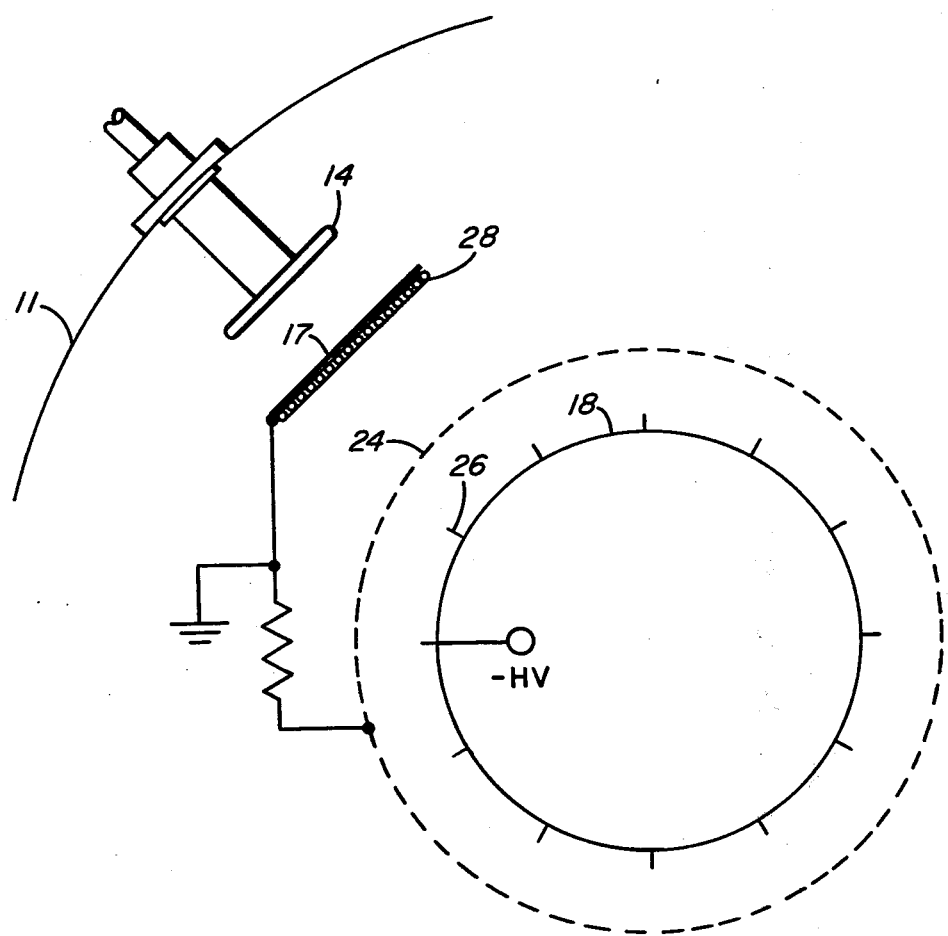
FIG. 3 is a schematic cross-section of the present invention.
Figure 4:
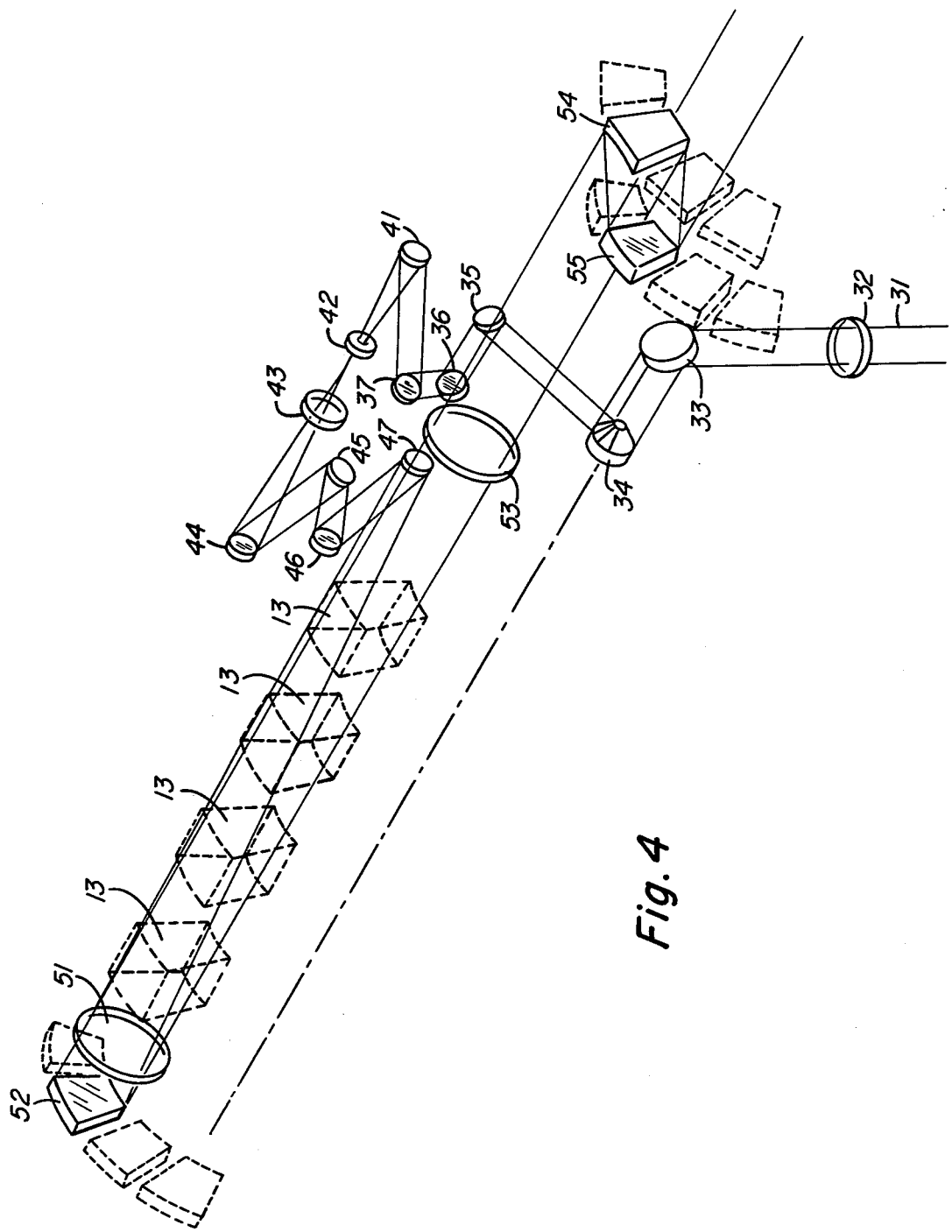
FIG. 4 illustrates schematically the path of an optical beam through the laser amplifier of the present invention.

Referring to the drawings, the laser amplifier of the present invention includes outer cylindrical tank 11 containing the lasing gas mixture and an evacuated inner cylindrical tank 12 containing the electron gun cathode 26 and grid 25. The inner tank 12 is evacuated to facilitate electron discharge. A plurality of electrical pumping chambers 13 contain the $CO_2$ lasing medium at a relatively high pressure, typically atmospheric pressure. Each pumping chamber 13 is provided with a plurality of anodes 14, symmetrically placed about the circumference of the pumping chamber.

The outer surface of pressure vessel 12 is centered concentrically with outer pressure vessel 11 by means of a plurality of bulkheads such as 15. The outer surface of inner vessel 12 forms a dodecagon. Each side 16 of the dodecagon vessel 12 has four windows 17 cut therein, one being provided for each chamber. These windows are covered with a 0.005 cm titanium alloy foil to allow passage of high energy electrons. As will be apparent, each slot 17 is placed underneath and adjacent to a corresponding anode 14. Inside inner pressure vessel 12 is a concentrically located cylindrical cold cathode electron gun 18. Electron gun 18 is supported at either end by high voltage insulators such as insulator 21 and insulator 22. In addition, a bellows 23 is provided to allow for differential expansion while maintaining concentricity of the electron gun 18 and the inner pressure vessel 12. The outermost portion 24 of the electron gun 18 is the grid. The grid consists of a stainless steel metal mesh 25 which is 0.08 cm thick, supported between two aluminum end bells by 12 stainless steel tubes. Inside grid 24 is the cold cathode structure. Tantalum foils are clamped to rectangular bars spanning the distance between the ends of an aluminum spool. The stem of the cathode spool is a hollow tube connecting the two ends. The tube allows the interior of the bushings to be filled with oil from one end.

The tantalum foil 17 is bonded to a 0.08 cm perforated metal sheet identical to the material of grid 25. An open rectangular frame 28 is bolted to the inner pressure vessel and serves to clamp the foil against an O-ring. This arrangement of foil support structure enables more positive sealing and eliminates catastrophic failures of the foil. Without the perforated metal plate 25, pinholes or breaks that develop in the foil would, due to the substantial pressure difference, grow and develop into extensive tears. In the present structure, propagation of such breaks is limited to one perforation in the metal sheath. The release of lasing gas into the gun chamber is of such limited quantity as to preclude damage to the electron gun.

The high voltage output of the Marx generator is connected to the cathode of the electron gun at bushing 58. The grid control current is returned through bushing 57. The low side of the Marx generator is connected through balancing inductors, located in the Marx generator to bushing 59 and to the pressure shell at point 60.

A single 15 cm diameter annular input beam having a power of less than 100 J is delivered to the power amplifier from a suitable master oscillator and intermediate power amplifier. Within the power amplifier, this input beam is split into 12 segments, each of which then makes two passes through the gain medium. The input beam 31 passes through a vacuum input window 32 to a turning mirror 33 and a polyhedron mirror 34. The polyhedron mirror 34 splits the single input beam into 12 segments. Following one segment of the beam, it is applied to a turning mirror 35, trombone mirrors 36 and 37, and focus mirror 41. Focus mirror 41 passes the beam through spatial filter 42 and input window 43. Input window 43 is in the pressurized bulkhead at the end of pressure vessel 11 carrying the lasing medium. Inside the pressure vessel are provided relay mirrors 44, 45, 46 and 47. Relay mirror 47 then passes the beam through lasing chambers 13, wherein it is amplified. The amplified beam is then passed through absorber window 51 and passed through a saturable absorber gas. The amplified beam is reflected by concave collimating mirror 52 back through the saturable absorber and window 51, through the lasing chambers 13 a second time. The beam is further amplified in lasing chambers 13. The beam, after its second pass through the lasing chambers, exits from the lasing medium through window 53. The output beam is reflected from first periscope mirror 54 and second periscope mirror 55, and finally passing through annular opening 56 to the desired target.

As will be apparent, the power amplifier comprises 12 trapezoidal beam segments clustered around the central cold cathode electron gun. The electron gun preionizes the lasing gas mixture prior to the main discharge. Each of the 12 beam segments has four electrodes which provide a 500 keV discharge lasting approximately 2 $\mu$s. Mirror 34 divides the input beam into 12 individual beams as disclosed hereinabove. The 12 beams, after amplification, exit through tube 56. Additional periscope mirrors, not shown, may be provided to combine the 12 output beams into one beam for application.

The front end beam enters through input window 32, which is conveniently fabricated of sodium chloride. Elements 35–47 provide for pulse synchronization, spatial filtering and retropulse protection. The large 18 inch diameter sodium chloride windows, 51 and 53, separate the 1800 torr lasing gas mixture from the gas saturable absorber and target vacuum system respectively. Plane mirrors 54 and 55 serve to compact the beam segments radially prior to entrance into the output beam tube, which connects the power amplifier to the desired target system. The sodium chloride windows are fabricated of polycrystalline sodium chloride forged from large single crystals to obtain adequate yield strength.

The mirrors are fabricated of plated copper. The mirrors after the first pass, comprising mirrors 52, 54 and 55, are large and of irregular shape. These are fabricated by single point diamond turning. The saturable absorber presently preferred, through which the beam is passed, comprises $SF_6$. As is well known, saturable absorbers serve two major functions. They improve the contrast ratio of the pulse, and also help eliminate the buildup of parasitic oscillations. As a result, saturable absorbers allow higher gains.

While the foregoing discloses one preferred embodiment of the high powered gas laser of the present invention, numerous variations and modifications of such structure, all within the scope of this invention, will readily occur to those skilled in the art. Accordingly, the foregoing description is to be considered only as illustrative of the principles of the invention and not as limiting. The scope of this invention is to be defined solely by the claims appended hereto.

We claim:

1. A laser power amplifier comprising:
   a central elongated, substantially cylindrical, vacuum vessel;
   an elongated electron gun contained within said central vacuum vessel; said elongated electron gun including central cathode means and substantially cylindrical electron control means concentric with, and surrounding said cathode means;
   an outer cylindrical pressure vessel surrounding said central elongated vessel;
   a gaseous lasing medium contained in a pumping volume between said outer pressure vessel and said central vacuum vessel;
   a plurality of electron windows in said central vacuum vessel enabling passage of the electrons into said pumping volume, said electron windows being arranged in annular rows about the periphery of said vacuum vessel;
   a plurality of insulated anode electrodes on said outer pressure vessel and within said pumping volume, each opposite one of said electron windows; and,
   a pulsed high voltage source electrically connected to said electron gun and to said plurality of anode electrodes.

2. In the amplifier set forth in claim 1, said electron gun comprising a plurality of circumferentially arranged cathodes in annular rows, a control grid surrounding said cathodes, a resistor connecting said grid and ground, and said insulated anode electrodes.

3. In the amplifier set forth in claim 2, said electron windows each comprising an electron transparent metallic foil and support means supporting said foil against pressure of said gaseous lasing medium outside said central vacuum vessel.

4. In the amplifier set forth in claim 3, said support means comprising a metallic grid.

5. In the amplifier set forth in claim 4, said gaseous lasing medium comprising carbon dioxide and nitrogen.

6. In a laser power amplifier, the combination of:
   a central electron gun producing a plurality of annularly radiating electron beams;
   a plurality of elongated optical pumping chambers surrounding said electron gun;
   an input laser beam;
   means for converting said input beam into a plurality of parallel, cylindrically arranged beams; and
   means for passing each of said parallel, cylindrically arranged beams through one of said elongated optical pumping chambers.

7. In the amplifier set forth in claim 6, polyhedral mirror means for splitting said input beam into a plurality of radially extending beams.

8. In the amplifier set forth in claim 7, a plurality of mirror means for directing each of said radially extending beams through one of said elongated pumping chambers, a retroreflective mirror associated with each of said pumping chambers to redirect said beams back through each of said pumping chambers, and output means directing each of said beams toward a target.

9. In the amplifier set forth in claim 8, a saturable absorber placed adjacent each of said retroreflective mirrors.

10. In the amplifier set forth in claim 9, a lasing medium in said pumping chambers comprising a mixture of carbon dioxide and nitrogen.

11. In a laser power amplifier, an electron gun for energizing a laser gas comprising:
    a central cylindrical support;
    a plurality of electron emitters circumferentially arranged in annular rows on said cylindrical support;
    a plurality of cylindrically arranged electron control grids, each adjacent one of said electron emitters;
    an elongated substantially cylindrical vacuum vessel containing said electron emitters and electron control grids;
    an outer elongated cylindrical vessel;
    gaseous lasing medium contained between said vacuum vessel and said outer vessel; and
    a plurality of electron windows arranged in annular rows in said vacuum vessel, each opposite one of said electron emitters.

12. In the amplifier set forth in claim 11, a resistor connecting said electron control grids to said electron emitters.

13. In the amplifier set forth in claim 12, means for connecting a negative high voltage source to said electron emitters.

14. In the amplifier set forth in claim 12, each of said electron windows comprising an electron transparent foil and support means for supporting said foil against the pressure of said gaseous lasing medium.

15. In the amplifier set forth in claim 14, said gaseous lasing medium comprising a mixture of carbon dioxide and nitrogen.

16. In the amplifier set forth in claim 15, said electron transparent foil comprising a tantalum foil.

17. In the amplifier set forth in claim 16, said support means having a gridlike form, and bonding means for bonding said tantalum foil to said gridlike support means.

* * * * *